Oct. 26, 1954     J. W. TATTER     2,692,591
COMBUSTION CHAMBER
Filed Aug. 13, 1952
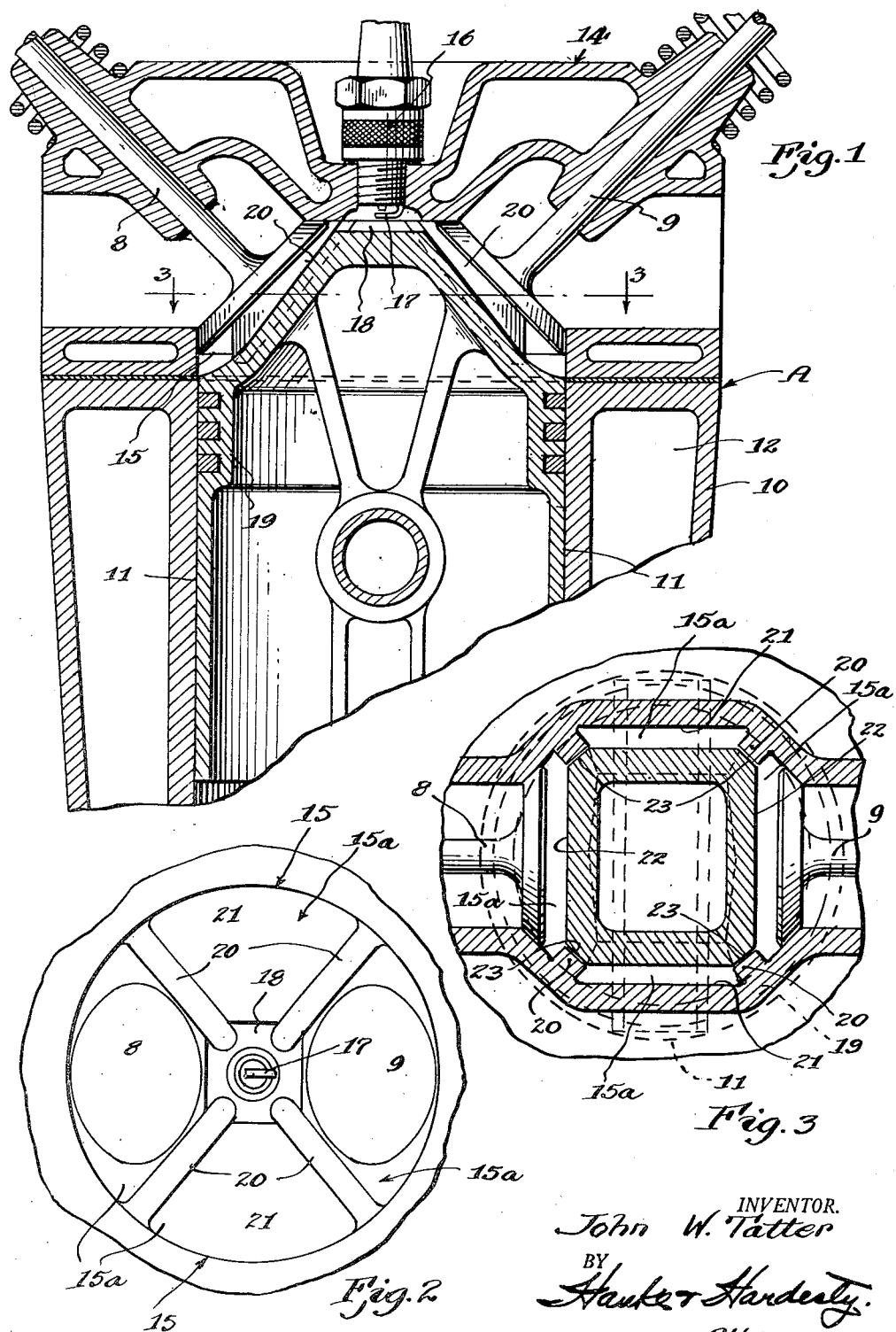
INVENTOR.
John W. Tatter
BY
Hauke & Hardesty.
Attorneys.

Patented Oct. 26, 1954

2,692,591

UNITED STATES PATENT OFFICE 2,692,591

COMBUSTION CHAMBER

John W. Tatter, Akron, Ohio

Application August 13, 1952, Serial No. 304,122

4 Claims. (Cl. 123—191)

My invention relates to internal combustion engines and more particularly to the combustion chamber as particularly adapted for application to an overhead valve engine in which the combustion chamber overlies the engine cylinder.

At present, great strides have been made in engine design and in fuels for internal combustion engines. The trend today is for higher speed engines, higher compression ratios, shorter piston strokes, more power and greater economy, and thus these advancements in the art are directly tied to combustion. The more perfect the combustion, the faster the charge is made to burn, and the more uniform the burning, the better are the engineers able to meet the demand for high speed, high powered engines, and to make use of higher compression ratios without the use of higher octane gasoline.

It is the object of my present invention to improve engine performance by providing a novel and improved combustion chamber, and which is more particularly constructed to more quickly and uniformly ignite the compressed combustible mixture and thereby permit a slower ignition advance and the practical use of a higher compression ratio without an objectionable preignition knock usually attendant with high compression engines.

For a more detailed understanding of my invention, reference may be had to the accompanying drawing illustrating a preferred embodiment thereof in which like parts are referred to by like characters throughout the several views, and in which Fig. 1 is a vertical transverse sectional view through an internal combustion engine embodying a combustion chamber constructed in accordance with my invention.

Fig. 2 is a bottom plan view of a fragmentary part of the cylinder head structure showing the combustion chamber recess in plan, and Fig. 3 is a detailed sectional view showing in plan section the general contour and shape of the combustion chamber and the engine piston, and also showing the plurality of separate combustion chambers.

While I have preferably illustrated my improved and novel combustion chamber design with valve-in-head internal combustion engine A of conventional design, it will be readily understood that the principles may be incorporated in other types of engines as well.

The internal combustion engine herein illustrated is of conventional design for the most part and comprises a cylinder block 10 having a cylinder bore 11 and the conventional cylinder jacket 12. A cylinder head structure 14 is secured in the customary manner to the cylinder block, carrying the intake and exhaust valves 8 and 9 respectively, and is provided with a combustion chamber recess 15 substantially overlying and axially aligned with the cylinder 11. The spark plug 16 is carried by the cylinder head 14 and spark points 17 are disposed substantially centrally of the spark plug chamber 18, said spark plug chamber being substantially centered in the recess 15 and aligned with the cylinder axis.

The combustion chamber recess 15 is generally pyramidal in contour having a plurality of radially outwardly extending ribs 20, projecting downwardly into the recess and whose inner ends terminate at the outer peripheral boundary of the spark plug chamber 18. The walls 21 of the recess intermediate the ribs 20 are substantially flat (see Fig. 3).

The top portion of the piston 19 is also pyramidal in contour and comprises a plurality of flat surfaces 22, the corners joining said flat surfaces forming ridges 23 having substantially the same slope and dimensions as the ribs 20. Thus the ridges 23 are complimentary to the ribs 20 and when the piston 19 is at top dead center, the ridges 23 have a minimum clearance with respect to the ribs 20 and said flat surface portions 22 of the piston cooperate with the flat wall surfaces 21 of the combustion chamber recess 15 to form separate segmental combustion chamber portions 15a, the apex of each of these segmental combustion chamber portions opening into the spark plug chamber 18 (see Fig. 2).

Thus during the initial combustion of the combustible mixture in the combustion chamber, these combustion chamber portions 15a are blocked off from each other, and the burning mixtures begin to merge only after the piston begins to move down the cylinder during the engine power stroke.

These plurality of small charges are all simultaneously ignited, they burn freely and lessen the tendency of producing an engine knock even when the compression ratio is greater than customary. This method of combustion provides for a uniform combustion and thus results in an improved engine performance.

It will be apparent to those skilled in the art to which my invention pertains that various changes and modifications may be made herein without departing from the spirit of my invention or from the scope of the appended claims.

I claim:

1. In an internal combustion engine, an engine cylinder and a piston operable in said cylinder, a cylinder head having a combustion chamber recess overlying said cylinder and a spark plug chamber centrally disposed in said combustion chamber, said combustion chamber having a plurality of radially extending ribs projecting inwardly of the chamber toward said piston, said piston top face having radially extending facings complimentary to the ribs of said cylinder head combustion chamber and adapted to closely approach same with a minimum clearance when the piston is disposed at top dead center, whereby to define a plurality of separate combustion chamber portions all communicating with said spark plug chamber and substantially isolated one from the other by said ribs and facings of the combustion chamber and piston respectively when said piston is disposed at top dead center.

2. In an internal combustion engine, an engine cylinder and a piston operable in said cylinder, a cylinder head having a combustion chamber recess overlying said cylinder and terminating at top center in an apex and a spark plug chamber centrally disposed in said combustion chamber, said piston and recess defining a combustion chamber, and means dividing said combustion chamber into a plurality of segmental separate combustion chamber portions openly communicating at their apex only with said spark plug chamber when said piston is disposed at top dead center.

3. In an internal combustion engine, an engine cylinder and a piston operable in said cylinder, a cylinder head having a combustion chamber recess overlying said cylinder and terminating at top center in an apex and a spark plug chamber centrally disposed in said combustion chamber, said piston and recess defining a combustion chamber, and means dividing said combustion chamber into a plurality of segmental separate combustion chamber portions openly communicating at their apex with said spark plug chamber, said means comprising radially extending partitions having their inner ends terminating at the outer boundary of the spark plug chamber and providing substantially separate flattened segmental combustion chamber portions when said piston is disposed at top dead center.

4. In an internal combustion engine, an engine cylinder and a piston operable in said cylinder, a cylinder head having a combustion chamber recess overlying said cylinder and terminating at top center in an apex and a spark plug chamber centrally disposed in said combustion chamber, said piston and recess defining a combustion chamber, and means dividing said combustion chamber into a plurality of segmental separate combustion chamber portions openly communicating at their apex with said spark plug chamber, said combustion chamber recess and said piston top each having a pyramidal contour.

References Cited in the file of this patent

UNITED STATES PATENTS

| Number | Name | Date |
| --- | --- | --- |
| 1,414,384 | Tartrais | May 2, 1922 |
| 1,838,495 | O'Neill | Dec. 29, 1931 |
| 2,254,438 | McCarthy | Sept. 2, 1941 |

FOREIGN PATENTS

| Number | Country | Date |
| --- | --- | --- |
| 635,111 | France | Dec. 17, 1927 |
| 900,686 | France | Oct. 16, 1944 |